(12) United States Patent
Trichy et al.

(10) Patent No.: US 10,404,168 B2
(45) Date of Patent: Sep. 3, 2019

(54) POWER CONVERTER CONTROL APPARATUS AND METHOD

(71) Applicant: Active-Semi (BVI), Inc., Allen, TX (US)

(72) Inventors: Narasimhan Trichy, Plano, TX (US); Masashi Nogawa, Sachse, TX (US)

(73) Assignee: Active-Semi (BVI), Inc., Allen, TX (US)

(*) Notice: Subject to any disclaimer, the term of this patent is extended or adjusted under 35 U.S.C. 154(b) by 0 days.

(21) Appl. No.: 15/949,575

(22) Filed: Apr. 10, 2018

(65) Prior Publication Data

US 2018/0375429 A1 Dec. 27, 2018

Related U.S. Application Data

(60) Provisional application No. 62/524,875, filed on Jun. 26, 2017.

(51) Int. Cl.
| | |
|---|---|
| *H02M 3/157* | (2006.01) |
| *H02M 3/158* | (2006.01) |
| *H02M 1/08* | (2006.01) |
| *H02M 1/15* | (2006.01) |
| *H02M 3/156* | (2006.01) |
| *H02M 1/00* | (2006.01) |

(52) U.S. Cl.
CPC ............ *H02M 3/157* (2013.01); *H02M 1/08* (2013.01); *H02M 1/15* (2013.01); *H02M 3/158* (2013.01); *H02M 3/1563* (2013.01); *H02M 3/1588* (2013.01); *H02M 2001/0032* (2013.01); *H02M 2001/0054* (2013.01)

(58) Field of Classification Search
CPC ...... H02M 3/1588; H02M 3/157; H02M 1/15; H02M 3/1563; H02M 1/08; H02M 3/158; H02M 2001/0032; H02M 2001/0054
See application file for complete search history.

(56) References Cited

U.S. PATENT DOCUMENTS

| | | | | |
|---|---|---|---|---|
| 8,823,344 | B2* | 9/2014 | Kushida | H02M 3/1588 323/271 |
| 9,252,661 | B2* | 2/2016 | Grbo | H02M 3/1588 |
| 9,531,266 | B2* | 12/2016 | Sreenivas | H02M 3/156 |
| 9,960,673 | B2* | 5/2018 | Matsuura | H02M 3/156 |
| 2004/0080965 | A1* | 4/2004 | Poon | H02M 3/158 363/125 |
| 2007/0182395 | A1* | 8/2007 | Sakai | H02M 3/1588 323/283 |
| 2010/0283441 | A1* | 11/2010 | Wang | H02M 1/14 323/282 |
| 2016/0248329 | A1* | 8/2016 | Phillips | H02M 3/158 |

* cited by examiner

*Primary Examiner* — Kyle J Moody
(74) *Attorney, Agent, or Firm* — Slater Matsil, LLP

(57) ABSTRACT

A power converter comprises a first switch and a second switch connected in series between an input power source and ground, an inductor connected between a common node of the first switch and the second switch, and an output capacitor and a comparator having a first input connected to a reference, a second input configured to receive a sum of a first feedback signal and a second feedback signal and an output configured to generate a turn-on signal of the first switch, wherein the first feedback signal is proportional to an voltage across the output capacitor and the second feedback signal is generated by applying at least one low-pass filter to a switching ripple voltage.

22 Claims, 12 Drawing Sheets

POWER CONVERTER CONTROL APPARATUS AND METHOD

CROSS REFERENCE TO RELATED APPLICATIONS

This application is related to, and claims priority to, U.S. Provisional Application No. 62/524,875, titled, "Power Converter Control Apparatus and Method" filed on Jun. 26, 2017, which is herein incorporated by reference.

TECHNICAL FIELD

The present invention relates to a control scheme of a power converter, and, in particular embodiments, to a power converter employing a constant on-time control scheme or a constant off-time control scheme.

BACKGROUND

As technologies further advance, a variety of electronic devices, such as mobile phones, tablet PCs, digital cameras, MP3 players and/or the like, have become popular. Each electronic device requires direct current power at a substantially constant voltage which may be regulated within a specified tolerance even when the current drawn by the electronic device may vary over a wide range. In order to maintain the voltage within the specified tolerance, a power converter (e.g., a switching dc/dc converter) coupled to the electronic device provides very fast transient responses, while keeping a stable output voltage under various load transients.

Hysteretic-based power converter control schemes such as the constant on-time scheme can enable power converters to provide fast transient responses. A buck converter employing the constant on-time control scheme does not require an error amplifier. In fact, a simple constant on-time circuit may only comprise a feedback comparator and an on-timer. In operation, the feedback circuit of the power converter (e.g., buck converter) directly compares a feedback signal including both dc and ripple voltages with an internal reference. When the feedback signal falls below the internal reference, the high-side switch of the power converter is turned on and remains on for the on-timer duration. As a result of turning on the high side switch, the inductor current of the power converter rises. The high-side switch of the power converter turns off when the on-timer expires, and does not turn on until the feedback signal falls below the internal reference again. In summary, when the constant on-time control scheme is employed in a power converter, the on-time of the high-side switch of the power converter is terminated by the on-timer. The off-time of the high-side switch of the power converter is terminated by the feedback comparator.

The power converters employing the constant on-time control scheme are simple to design. However, the constant on-time control scheme has an unwanted behavior. In particular, a power converter employing the constant on-time control scheme may enter a burst mode (skipping pulses) when it operates under light load conditions. The burst mode may generate an excessive ripple voltage at the output of the power converter. Such an excessive ripple voltage is not preferable in many applications.

It would be desirable to provide an apparatus and/or a method for enabling the power converters employing the constant on-time control scheme to avoid the burst mode under light load conditions.

SUMMARY

In particular embodiments, a control scheme may achieve fast transient responses and improve the performance of a hysteretic-based power converter under light load conditions.

In accordance with an embodiment, an apparatus comprises a first switch and a second switch connected in series between an input power source and ground, an inductor connected between a common node of the first switch and the second switch, and an output capacitor and a comparator having a first input connected to a reference, a second input configured to receive a sum of a first feedback signal and a second feedback signal and an output configured to generate a turn-on signal of the first switch, wherein the first feedback signal is proportional to an voltage across the output capacitor of a low-pass filter in parallel with the inductor. The second feedback signal is generated by applying at least one low-pass filter to a switching ripple voltage. The voltage across the capacitor of the first low-pass filter emulates the inductor current ripple and this signal is the desired signal for feedback purposes. The second feedback signal is generated by applying at least one low-pass filter to a switching ripple voltage. This second feedback signal is then summed with the dc feedback signal—essentially add a ripple component to generate a switching ripple voltage on top of the dc feedback signal. This is used as the input of the on-comparator (104) shown in FIGS. 7-9.

In accordance with another embodiment, a method comprises applying a hysteretic control mode to a power converter, monitoring an output voltage of the power converter and configuring the power converter to operate in a minimum switching frequency mode when the output voltage of the power converter exceeds a rising threshold of a first comparator, in the minimum switching frequency mode, configuring the power converter to operate in a turn-off mode when the output voltage of the power converter exceeds a rising threshold of a second comparator and configuring the power converter to operate in the hysteretic control mode when the output voltage of the power converter drops below a falling threshold of the first comparator and in the turn-off mode, configuring the power converter to operate in the minimum switching frequency mode when the output voltage of the power converter drops below a falling threshold of the second comparator.

In accordance with yet another embodiment, a power converter comprises a first switch and a second switch connected in series between an input power source and ground, an inductor connected between a common node of the first switch and the second switch, and an output capacitor, a feedback control apparatus comprising a first low-pass filter connected in parallel with the inductor, a high-pass filter and a comparator having a first input connected to a reference and a second input configured to receive a sum of a signal detected from the output capacitor and an output signal generated by the first low-pass filter and the high-pass filter, wherein poles and zeros that determine settings of the filters are adjustable and the poles and zeros are reconfigured automatically depending on a switching frequency and a mode of operation of the power converter, an on-time control apparatus and a latch having a set input configured to receive an output signal of the feedback control apparatus and a reset input configured to receive an output signal of the on-time control apparatus.

An advantage of a preferred embodiment of the present disclosure is improving a power converter's performance through a constant on-time control mechanism.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a constant on-time control apparatus and method for a hysteretic-based power converter. The invention may also be applied, however, to a variety of power converters. Hereinafter, various embodiments will be explained in detail with reference to the accompanying drawings.

Figure 1:
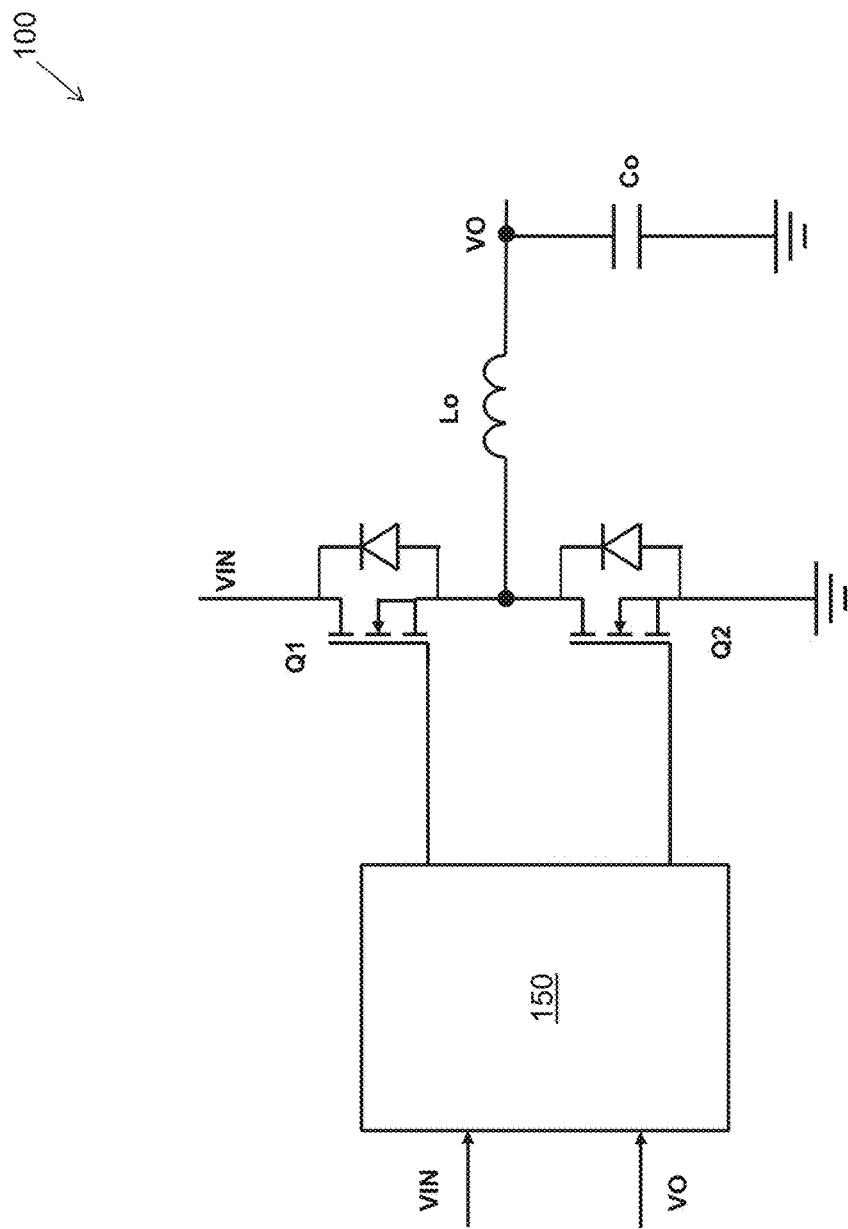
FIG. 1 illustrates a block diagram of a power converter in accordance with various embodiments of the present disclosure.

FIG. 1 illustrates a block diagram of a power converter in accordance with various embodiments of the present disclosure. The power converter 100 is a step-down power converter (also known as a buck converter). The power converter 100 includes a first switch Q1, a second switch Q2, an inductor Lo and an output capacitor Co. As shown in FIG. 1, the first switch Q1 and the second switch Q2 are connected in series between an input power source VIN and ground. The inductor Lo is connected between the common node of the first switch Q1 and the second switch Q2, and the output capacitor Co.

In some embodiments, the power converter 100 is a constant on-time power converter. In alternative embodiments, the power converter 100 may be a constant off-time power converter.

The first switch Q1 and the second switch Q2 are implemented as n-type transistors. The gate of the first switch Q1 and the gate of the second switch Q2 are controlled by a control apparatus 150.

It should be noted that the power converter 100 shown in FIG. 1 is merely an example, which should not unduly limit the scope of the claims. One of ordinary skill in the art would recognize many variations, alternatives, and modifications. For example, the first switch Q1 may be implemented as a p-type transistor.

In some embodiments, the control apparatus 150 may apply a constant on-time control scheme to the power converter 100. In addition, the control apparatus 150 may configure the power converter 100 to operate in light load operating modes so as to achieve better regulation and reduce power losses. More particularly, the control apparatus 150 may comprise a feedback control apparatus and an on-time control apparatus for controlling the power converter 100 so that the power converter operates in a constant on-time mode. Furthermore, the control apparatus 150 may comprise a plurality of comparators and a minimum frequency control unit for configuring the power converter 100 to operate in a minimum switching frequency mode or a turn-off mode under light load conditions. As a result, the power converter 100 can achieve better regulation and reduce power losses.

As shown in FIG. 1, the control apparatus 150 is configured to receive the input voltage VIN and the output voltage Vo. Based upon the output voltage Vo and/or the input voltage VIN, the control apparatus 150 generates two gate signals for controlling the operation of the power converter 100. The detailed operation of the control apparatus 150 will be described below with FIGS. 2-9.

Figure 2:
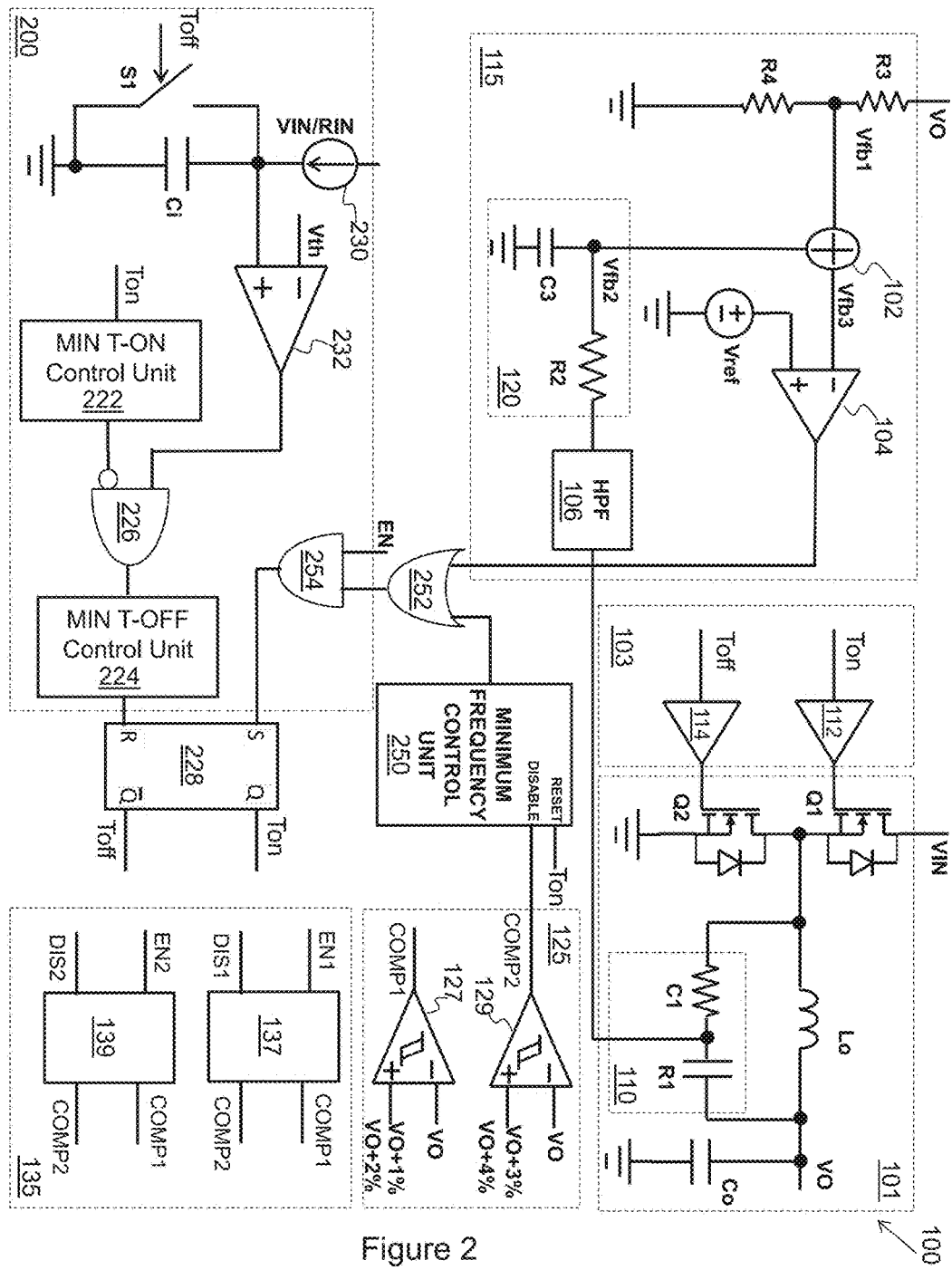
FIG. 2 illustrates a schematic diagram of the power converter shown in FIG. 1 in accordance with various embodiments of the present disclosure.

FIG. 2 illustrates a schematic diagram of the power converter shown in FIG. 1 in accordance with various embodiments of the present disclosure. The control circuit of the power converter 100 comprises a feedback control apparatus 115, an on-time control apparatus 200, a minimum frequency control unit 250, an enable and disable control unit 135, a latch 228, a plurality of logic gates (e.g., OR gate 252 and AND gate 254), a comparator apparatus 125 and a driver apparatus 103.

The feedback control apparatus 115 is used to monitor the output voltage and turn on the high-side switch Q1 when the detected output voltage is below a predetermined reference. After the high-side switch Q1 has been turned on, the turn-off of the high-side switch Q1 is determined by the on-time control apparatus 200. The detailed operation principles of the feedback control apparatus 115 and the on-time control apparatus 200 will be described below with respect to FIGS. 3-4, respectively.

The minimum frequency control unit 250, the enable and disable control unit 135 and the comparator apparatus 125 are employed to monitor the output voltage and configure the power converter 100 to operate in the minimum switching frequency mode or the turn-off mode so as to achieve better voltage regulation. For example, one output of the comparator apparatus 125 is used to disable the minimum frequency control unit 250 so that the power converter can leave the minimum switching frequency mode and enter into the turn-off mode. The enable and disable control unit 135 may generate a plurality of control signals (e.g., EN1, DIS1, EN2 and DIS2) for better controlling the power converter during the transition between the minimum switching frequency mode and the turn-off mode. The detailed operation principles of the minimum switching frequency mode and the turn-off mode will be described below with respect to FIGS. 5-6.

Figure 3:
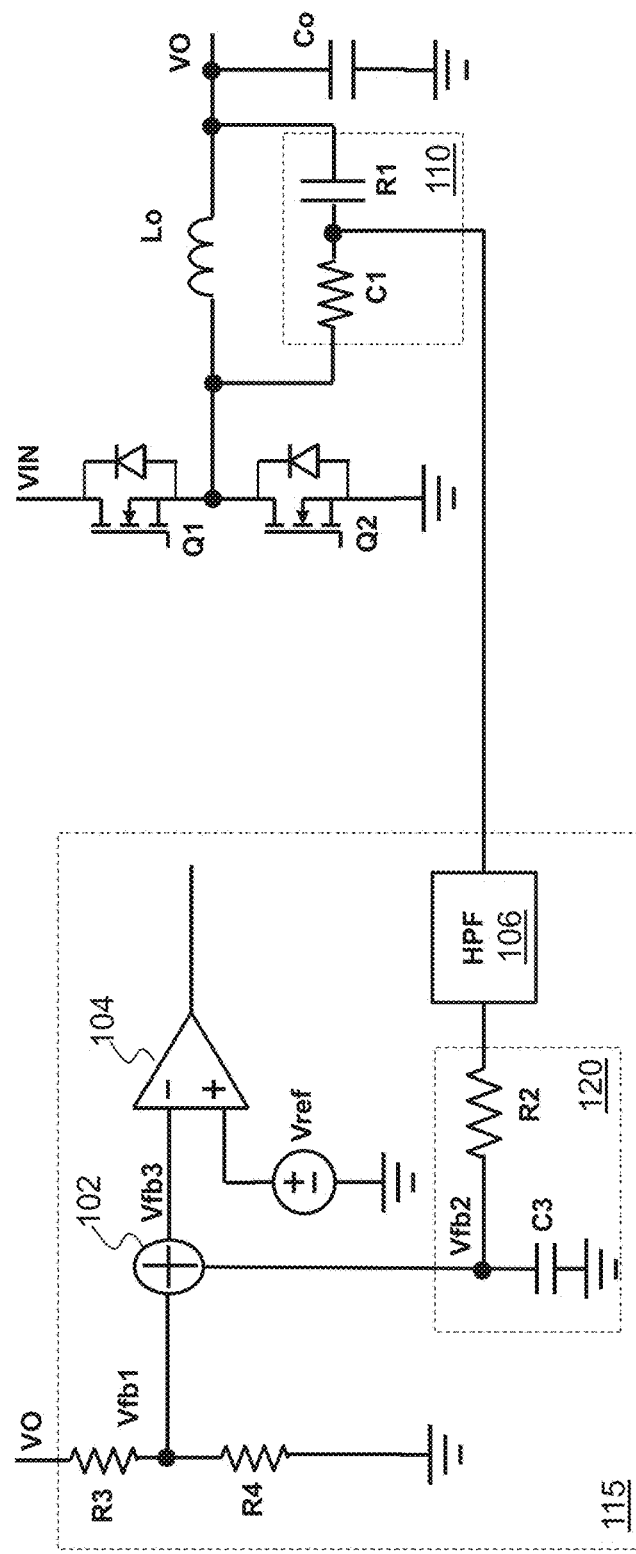
FIG. 3 illustrates a schematic diagram of the feedback control apparatus shown in FIG. 2 in accordance with various embodiments of the present disclosure.

FIG. 3 illustrates a schematic diagram of the feedback control apparatus shown in FIG. 2 in accordance with various embodiments of the present disclosure. The feedback control apparatus 115 comprises a voltage divider formed by resistors R1 and R2, a comparator 104, a reference voltage Vref, a high-pass filter 106 and a low-pass filter 120.

As shown in FIG. 3, the comparator 104 has a non-inverting input connected to a reference voltage Vref and an inverting input configured to receive a feedback signal Vfb3. As shown in FIG. 3, the feedback signal Vfb3 is equal to a sum of a first feedback signal Vfb1 and a second feedback signal Vfb2. The reference Vref has a predetermined value (e.g., 0.8 V). Depending on different applications and design needs, the reference Vref may vary accordingly. The output of the comparator 104 is coupled to one input of a PWM generation circuit (e.g., latch 228 shown in FIG. 2). The PWM generation circuit 228 will be described below with respect to FIG. 4.

The first feedback signal Vfb1 is generated by dividing the output voltage Vo through a divider formed by resistors R3 and R4. Throughout the description, the first feedback signal Vfb1 is alternatively referred to as a raw feedback signal. The third feedback signal Vfb3 is alternatively referred to as a final feedback signal.

It should be noted that generating the first feedback signal Vfb1 through a divider is merely an example. A person skilled in the art would understand there may be many variations, modifications and alternatives. For example, the first feedback signal Vfb1 may be detected directly from the output voltage Vo.

The second feedback signal Vfb2 is generated by applying a first low-pass filter 110, a high-pass filter 106 and a second low-pass filter 120 to a switching ripple signal. As shown in FIG. 3, the first low-pass filter 110 is formed by resistor R1 and capacitor C1. The second low-pass filter 120 is formed by resistor R2 and capacitor C3. The high-pass filter 106 may be formed by a resistor and a capacitor. In particular, the high-pass filter 106 may be is implemented by placing an input voltage across the series combination of a capacitor and a resistor and using the voltage across the resistor as an output of the high-pass filter 106.

As shown in FIG. 3, the first low-pass filter 110 is connected in parallel with the inductor Lo. The first low-pass filter 110 may function as a current sense circuit. Since the current flowing through the inductor Lo includes a switching ripple component, the voltage across the capacitor C1 is a switching ripple signal. Adding this switching ripple signal into the feedback circuit of the power converter 100 is equivalent to feeding forward the phase information of the current flowing through the inductor Lo into the feedback circuit. As shown in FIG. 3, the switching ripple signal is generated by the voltage signal applied to the input of the inductor Lo. The voltage signal applied to the input of the inductor Lo has less phase lag than the output voltage Vo because there is an L-C filter (formed by Lo and Co) between these two signals. As such, adding the switching ripple signal into the feedback circuit helps to improve the performance (e.g., transient responses) the power converter 100.

As shown in FIG. 3, the second low-pass filter 120 has an input connected to the common node of resistor R1 and capacitor C1 through the high-pass filter 106. The output of the second low-pass filter 120 is connected to a first input of an adder 102. The second input of the adder 102 is connected to the common node of resistors R3 and R4. The output of the adder 102 is connected to the inverting input of the comparator 104.

In some embodiments, depending on different applications and design needs, the common node of R1 and C1 may be connected to the input of the second low-pass filter 120 directly. In alternative embodiments, the power converter 100 may comprise a second high-pass filter (not shown but illustrated in FIG. 10).

The first low-pass filter 110 and the high-pass filter 106 form a band-pass filter. Such a band-pass filter is employed to generate the necessary ripple for the constant on-time control and inject the ripple voltage signal into the feedback circuit of the power converter 100. The second low-pass filter 120 is employed to improve the voltage regulation of the power converter 100.

In some embodiments, the hysteretic burst behavior of the power converter 100 may occur at the crossover frequency (also known as the unity gain frequency) which is about one fifth or one tenth of the switching frequency of the power converter 100. By adding second low-pass filter 120 formed by R2 and C3, the hysteretic burst behavior of the power converter 100 can be eliminated or reduced. More particularly, the second low-pass filter 120 may function as an integrator. Such an integrator can help the power converter 100 to avoid the burst mode when the power converter 100 operates at light loads.

In some embodiments, the pole of the second low-pass filter 120 may be placed between the crossover frequency and the switching frequency of the power converter 100. In alternative embodiments, the pole of the second low-pass filter 120 is designed to be lower than the crossover frequency (e.g., about one tenth of the crossover frequency). Such a low frequency pole helps to stabilize the power converter 100.

Furthermore, the pole of the second low-pass filter 120 may be dynamically adjustable. In particular, the location of the pole may change in response to different operating modes (e.g., a minimum switching frequency mode) of the power converter 100. The adjustable pole of the second low-pass filter 120 will be described below with respect to FIGS. 7-9.

One advantageous feature of having the second low-pass filter 120 of FIG. 3 is that the second low-pass filter 120 can prevent the power converter 100 from operating in the hysteretic burst mode. As a result, the power converter 100 does not include an error amplifier, which may require extra quiescent power consumption.

Another advantageous feature of having the second low-pass filter 120 of FIG. 3 is that the second low-pass filter 120 may provide ripple cancellation for the feedback circuit of the power converter 100, thereby improving the output voltage accuracy.

Figure 4:
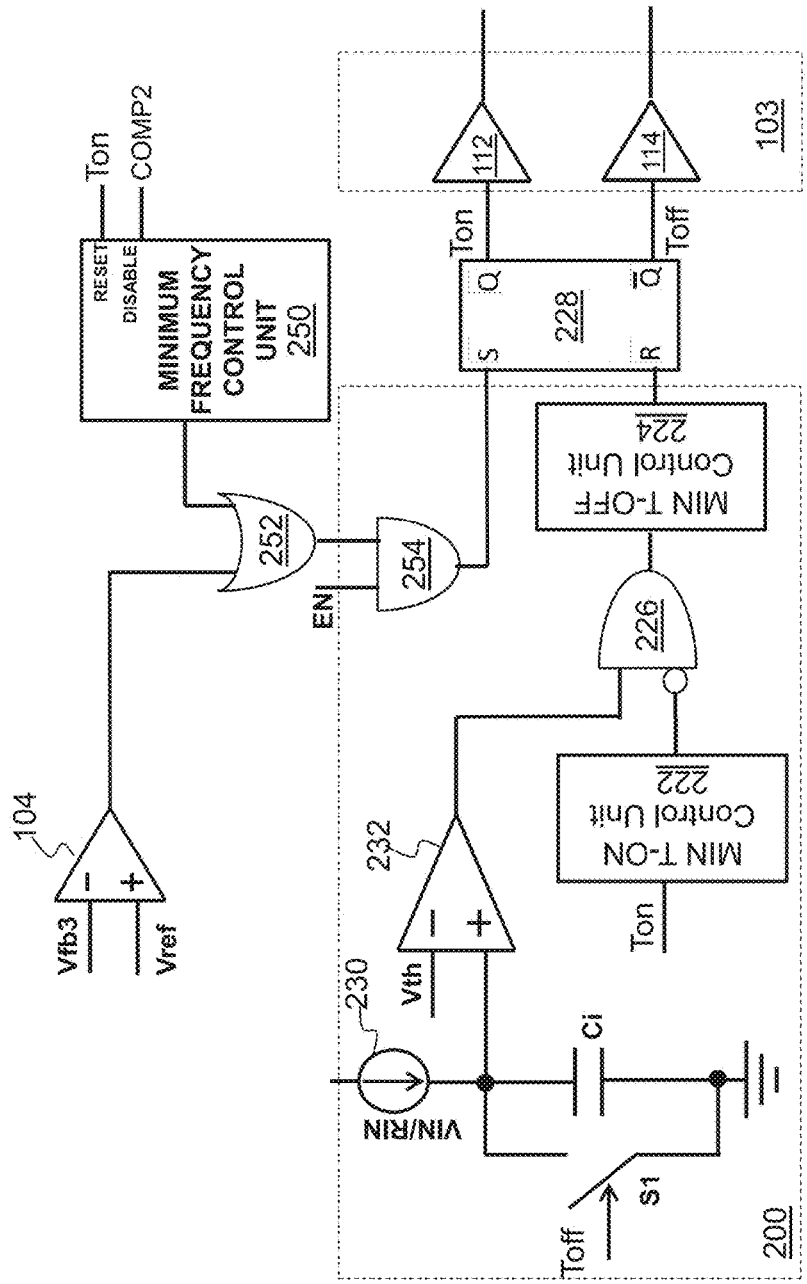
FIG. 4 illustrates a schematic diagram of the on-time control apparatus shown FIG. 2 in accordance with various embodiments of the present disclosure.

FIG. 4 illustrates a schematic diagram of the on-time control apparatus shown FIG. 2 in accordance with various embodiments of the present disclosure. As shown in FIG. 4, the output of the on-time control apparatus 200, the output of the comparator 104 and the output of the minimum frequency control unit 250 are fed into a PWM generation circuit 228 in which gate drive signals are generated. Referring back to FIG. 2, the gate drive signals are 2 applied to the switches of the power converter 100 through the driver apparatus 103.

In some embodiments, the PWM generation circuit 228 is implemented as an R-S latch as shown in FIG. 4. Throughout the description, the PWM generation circuit 228 may be alternatively referred to as the R-S latch 228. The set input of the R-S latch 228 is connected to an output of an AND gate 254. The reset input of the R-S latch 228 is connected to an output of the on-time control apparatus 200. The output of the R-S latch 228 is connected to the gates of the switches Q1 and Q2 through the driver apparatus 103.

The Q output of the R-S latch 228 is connected to the gate of the high-side switch Q1 through the first buffer 112. The Q output of the R-S latch 228 is alternatively referred to as a turn-on time (Ton) of the high-side switch Q1. The Q-bar output (the inverse of the Q output) of the R-S latch 228 is connected to the gate of the low-side switch Q2 through the second buffer 114. The Q-bar output of the R-S latch 228 is alternatively referred to as a turn-off time (Toff) of the high-side switch Q1.

Both the first buffer 112 and the second buffer 114 function as drivers providing high speed and high current drive capability for the power converter 100. The first buffer 112 may further comprise a level-shifting circuit for driving an n-channel high-side switch.

The AND gate 254 has a first input configured to receive an enable (EN) signal and a second input connected to an output of an OR gate 252. The OR gate 252 has a first input connected to the output of the comparator 104 and a second input connected to an output of the minimum frequency control unit 250. The minimum frequency control unit 250 functions as a timer. In some embodiments, the maximum frequency of the pulses generated by the minimum frequency control unit 250 is about 100 kHz. The timer can be reset by a reset signal. As shown in FIG. 4, the turn-on signal of the switch Q1 is used to reset the timer. In other words, if the switching frequency of the power converter 100 is greater than the frequency of the signal generated by the minimum frequency control unit 250, the timer is periodically reset by the turn-on signal of the switch Q1. As a result of resetting the timer, the output of the OR gate 252 is determined by the output of the comparator 104. On the other hand, if the switching frequency of the power converter 100 is less than the frequency of the signal generated by the minimum frequency control unit 250, the output of the OR gate 252 is determined by the signal generated by the minimum frequency control unit 250. The output of the OR gate 252 is fed into the set input of the R-S latch 228. As a result, the power converter 100 operates at a switching frequency approximately equal to the frequency of the signal generated by the minimum frequency control unit 250.

According to the operating principle of the R-S latch, the output of the feedback control apparatus 115 determines the turn-on edge or the leading edge of the gate drive signal applied to Q1. The output of the on-time control apparatus 200 determines the turn-off edge or the trailing edge of the gate drive signal applied to Q1.

The on-time control apparatus 200 includes a current source 230, a capacitor Ci, a switch S1, a comparator 232, a minimum TON control unit 222, a minimum TOFF control unit 224 and an AND gate 226. The current source 230 may be coupled to the input voltage VIN. In some embodiments, the current level of the current source 230 is proportional to the input voltage VIN. In some embodiments, the current level of the current source 230 is equal to the input voltage VIN divided by a predetermined resistor RIN. The voltage across the capacitor Ci is fed into a non-inverting input of the comparator 232. The inverting input of the comparator 232 is connected to a predetermined reference Vth.

In operation, when Q1 is turned on, a logic level "1" and a logic level "0" are applied to the set input and the reset input of the R-S latch 228 respectively. The logic level "0" turns off the switch S1. As a result of turning off the switch S1, the current source 230 starts to charge the capacitor Ci in a linear manner. The voltage across the capacitor Ci is compared with the predetermined reference Vth at the comparator 232. After the voltage across the capacitor Ci reaches the voltage of the predetermined reference Vth, the output of the comparator 232 generates a logic level "1" which generates a logic level "0" at the Q output and a logic level "1" at the Q-bar output of the R-S latch 228. The logic level "0" at the Q output is used to turn off the switch Q1. The logic level "1" at the Q-bar output is used to turn on the switch Q2. As shown in FIG. 4, the logic level "1" at the Q-bar output is also used to turn on the switch S1. The turned-on switch S1 discharges the capacitor Ci and maintains the voltage across the capacitor Ci equal to about zero. As such, the voltage across the capacitor Ci is a voltage ramp. This voltage ramp is in sync with the gate drive signal applied to Q1. In other words, the voltage ramp starts from zero and linearly rises during the turn-on time of Q1. The voltage ramp goes back to zero at the trailing edge of the gate drive signal applied to Q1.

The on-time control apparatus 200 shown in FIG. 4 can also apply a scalable constant on-time control mechanism to the power converter 100 so as to further improve the performance of the power converter 100. Under the scalable constant on-time control mechanism, the on-time of the high-side switch Q1 of the power converter 100 can be scaled automatically to track a ratio of the output voltage Vo to the input voltage VIN.

It should be noted that in some embodiments, the scalable constant on-time control scheme can be used independently.

Alternatively, the scalable constant on-time control scheme can be combined with the constant on-time control scheme described above with respect to FIG. 3.

In some embodiments, the current flowing through the current source 230 is proportional to the input voltage VIN. As shown in FIG. 4, the current of the current source 230 is equal to VIN/RIN, where RIN is an input resistor. Depending on different applications and design needs, the value of RIN may vary accordingly.

The current source 230 is used to charge a capacitor Ci. In particular, during the turn-on time (Ton) of the switch Q1, the current source 230 charges the capacitor Ci in a linear manner. During the turn-off time (Toff) of the switch Q1, the switch S1 is turned on to short the capacitor Ci. As a result, a voltage ramp is generated across the capacitor Ci. The voltage ramp is compared with the reference Vth at a comparator 232. In some embodiments, the reference Vth is proportional to the output voltage Vo.

The turn-on signal Ton is fed into the minimum TON control unit 222. The minimum TON control unit 222 is a mono-stable multi-vibrator with an edge triggered input. On every rising edge, the minimum TON control unit 222 starts a predetermined timer and sets the output to a logic high state. After the predetermined timer expires, the output of the minimum TON control unit 222 returns to a logic low stage. In some embodiments, the predetermined timer is about 26 nanoseconds.

As shown in FIG. 4, the output of the minimum TON control unit 222 and the output of the comparator 232 are fed into the AND gate 226. It should be noted that the output of the minimum TON control unit 222 is connected to an input of the AND gate 226 through an inverter. The output of the AND gate 226 is fed into the minimum TOFF control unit 224. The minimum TOFF control unit 224 is similar to the minimum TON control unit 222, and hence is not discussed in detail again to avoid repetition.

The output of the minimum TOFF control unit 224 is connected to the reset input of the R-S latch 228. According to the operating principle of the R-S latch, the on-time of the switch Q1 is terminated by the output of the minimum TOFF control unit 224. In some embodiments, the on-time of the switch Q1 may be expressed as:

$$T_{on} = C i \cdot V o \cdot n \cdot \frac{RIN}{VIN} \quad (1)$$

where n is a predetermined parameter in a range from 0 to 1.

The on-time of the switch Q1 can be simplified as:

$$T_{on} = K_{on} \cdot \frac{Vo}{VIN} \quad (2)$$

where $K_{on} = Ci \cdot n \cdot RIN$. Under the control of the on-time control apparatus 200, the power converter 100 behaves as a constant on-time controlled power converter at any given input/output voltage operating point. Equation (2) shows the on-time Ton adjusts based upon the ratio of the output voltage Vo to the input voltage VIN.

Figure 5:
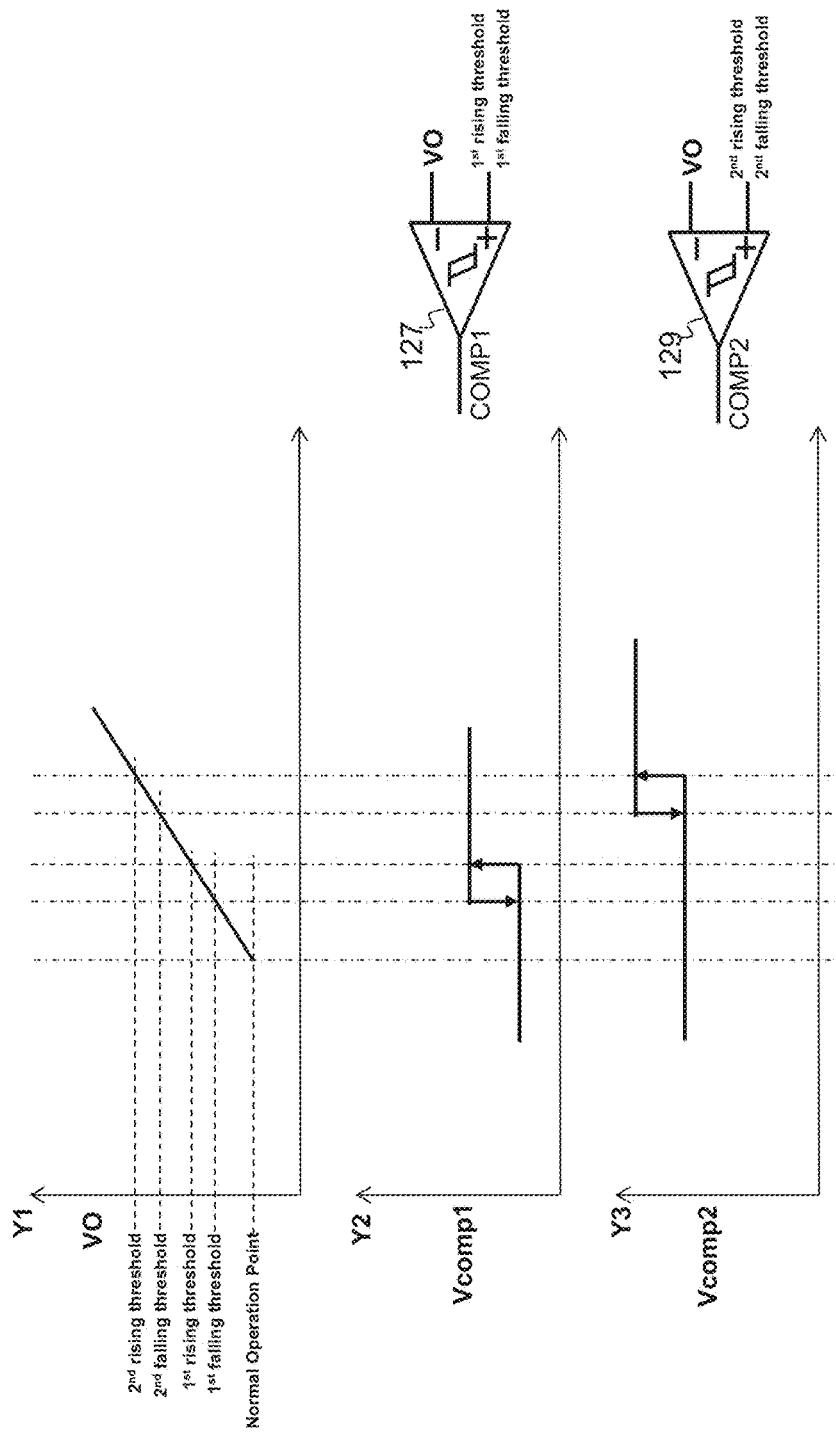
FIG. 5 is a threshold voltage chart illustrating the operating principle of the power converter shown in FIG. 1 in accordance with various embodiments of the present disclosure.

FIG. 5 is a threshold voltage chart illustrating the operating principle of the power converter shown in FIG. 1 in accordance with various embodiments of the present disclosure. There may be three vertical axes. The first vertical axis Y1 represents the output voltage of the power converter 100. The second vertical axis Y2 represents voltage thresholds of the first comparator 127. The third vertical axis Y3 represents voltage thresholds of the second comparator 129.

In operation, the power converter 100 is regulated to its normal operation point (e.g., nominal set-point). In some embodiments, the normal operation point is 1.0 V. When the power converter 100 operates in light load or standby conditions, the output voltage of the power converter 100 may be away from its normal operation point. In order to prevent the output voltage of the power converter 100 from being drifted to a high level, a plurality of ultra-low power operating modes is employed. In particular, a first comparator 127 and a second comparator 129 are employed to monitor the output voltage of the power converter 100. Based upon the detected output voltage, the power converter 100 may enter into different operation modes accordingly. Throughout the description, the first comparator 127 is alternatively referred to as the first operation mode comparator 127. The second comparator 129 is alternatively referred to as the second operation mode comparator 129.

In some embodiments, both the first comparator 127 and the second comparator 129 are implemented as hysteresis comparators having a rising threshold and a falling threshold as shown in FIG. 5. For example, the first comparator 127 has a first rising threshold and a first falling threshold. In some embodiments, the first rising threshold is about 1.02 V. The first falling threshold is about 1.01 V. The second comparator 129 has a second rising threshold and a second falling threshold. In some embodiments, the second rising threshold is about 1.04 V. The second falling threshold is about 1.03 V.

In operation, the first comparator 127 is employed to monitor the output voltage of the power converter 100 so that the power converter 100 is able to operate in either the normal operation mode or the minimum switching frequency mode depending on the detected output voltage. The first rising threshold is used when the output voltage is rising. Once the output voltage reaches the first rising threshold (e.g., 1.02 V), the output COMP1 of the first comparator 127 changes from a logic high state to a logic low state. In response to the logic stage change, the power converter 100 enters into the minimum switching frequency mode so as to prevent the output voltage of the power converter 100 from being drifted to a higher level. On the other hand, when the output voltage of the power converter 100 is discharged by the load or leakage current, and the output voltage reaches the first falling threshold (e.g., 1.01 V), the output COMP1 of the first comparator 127 changes from a logic low state to a logic high state. In response to the logic stage change, the power converter 100 leaves the minimum switching frequency mode and enters into the normal operation mode.

In operation, the second comparator 129 is employed to monitor the output voltage of the power converter 100 so that the power converter 100 is able to operate in either the minimum switching frequency mode or the turn-off mode depending on the detected output voltage. In the turn-off mode, both Q1 and Q2 of the power converter 100 are shut down to reduce the switching losses. The second rising threshold is used when the output voltage is rising. Once the output voltage passes the second rising threshold (e.g., 1.04 V), the output COMP2 of the second comparator 129 changes from a logic high state to a logic low state. In response to the logic stage change, the power converter 100 stops switching and enters into the turn-off mode. Referring back to FIG. 4, the output COMP2 is used to disable the minimum frequency control unit 250. As a result of disabling the minimum frequency control unit 250, the power converter 100 leaves the minimum switching frequency mode and enters into the turn-off mode.

The turn-off of the switches of the power converter 100 allows the power converter 100 to operate with nearly zero power consumption. On the other hand, when the output voltage of the power converter 100 is discharged by the load or leakage current, and the output voltage reaches the second falling threshold (e.g., 1.03 V), the output COMP2 of the second comparator 129 changes from a logic low state to a logic high state. In response to this logic stage change, the power converter 100 enters into the minimum switching frequency mode. Referring back to FIG. 4, the logic state change of the output COMP2 enables the minimum frequency control unit 250. As a result of enabling the minimum frequency control unit 250, the power converter 100 leaves the turn-off mode and enters into the minimum switching frequency mode.

In some embodiments, the minimum switching frequency of the power converter 100 is about 100 kHz. It should be noted that the minimum switching frequency of 100 kHz described above is merely an example. A person skilled in the art would understand there may be many variations, modifications and alternatives. For example, by setting the timer of the minimum frequency control unit 250 to a different value, the minimum switching frequency of the power converter 100 can be adjusted accordingly. Furthermore, by controlling the minimum switching frequency, the load current at which the power converter 100 will transition from the normal operating mode to the ultra-low power operating mode (minimum switching frequency) and back to the normal mode can be adjusted.

Figure 6:
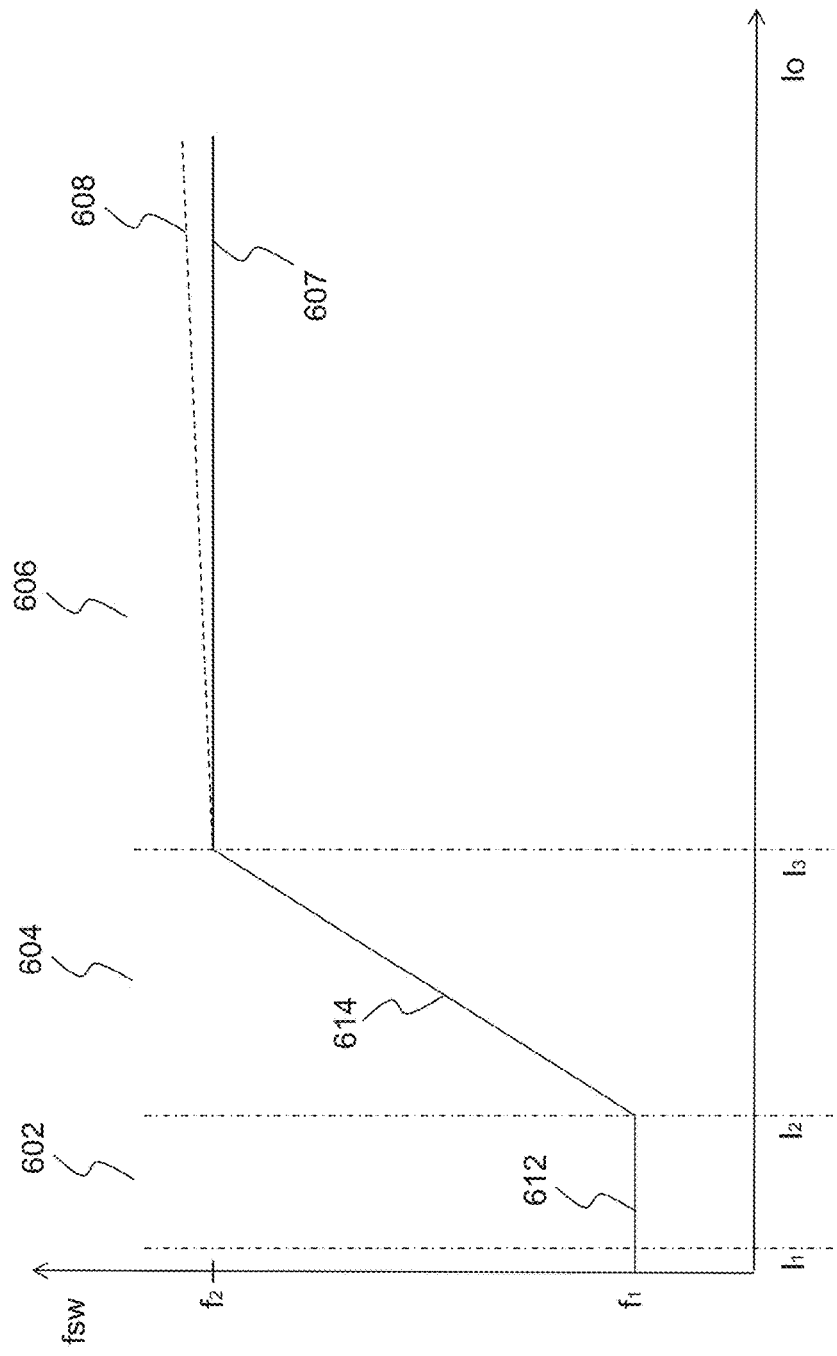
FIG. 6 is a switching frequency chart illustrating the operating principle of the power converter shown in FIG. 1 in accordance with various embodiments of the present disclosure.

FIG. 6 is a switching frequency chart illustrating the operating principle of the power converter shown in FIG. 1 in accordance with various embodiments of the present disclosure. The horizontal axis of FIG. 3 represents the current flowing through the power converter 100. The vertical axis represents the switching frequency of the power converter 100.

As shown in FIG. 6, the switching frequency profile of the power converter 100 includes three portions, namely a first portion 602 including a first straight line 612, a second portion 604 including a first slope 614 and a third portion 606 including a second straight line 607.

In operation, when the current flowing through the power converter 100 is greater than I3, the power converter 100 operates at a frequency f2 as indicated by the second straight line 607. In some embodiments, I3 is the current boundary between the continuous conduction mode (CCM) and the discontinuous conduction mode (DCM) of the power converter 100. The frequency f2 is determined by the constant on-time control of the power converter 100. Depending on design needs and different applications, the switching frequency of the power converter 100 may not remain constant as indicated by the second straight line 607. Instead, as the current flowing through the power converter 100 increases, the switching frequency of the power converter 100 may increase slightly as indicated by the dashed slope line 608.

In operation, when the current flowing through the power converter 100 drops below the current boundary between the CCM and the DCM, the switching frequency of power converter 100 may drop in a pseudo-linear manner as indicated by the first slope 614. In the second portion 604 shown in FIG. 6, the second low-pass filter 120 (shown in FIG. 2) helps the power converter 100 to operate at a reduced switching frequency mode rather than a burst mode. More particularly, in response to a reduced load current (from I3 to I2), the second low-pass filter 120 helps the power converter 100 to avoid entering into the burst mode (irregular pulses) and stay at a non-burst mode (regular pulses). Under the non-burst mode and light loads, the output voltage Vo can still be maintained and regulated through reducing the switching frequency of the power converter 100 as indicated by the first slope 614.

When the current flowing through the power converter 100 drops below a predetermined minimum switching frequency threshold I2, the power converter 100 enters into the minimum switching frequency mode as indicated by the first straight line 612. The minimum switching frequency mode has been described above with respect to FIG. 5, and hence is not discussed again herein. During the minimum switching frequency mode, if the current flowing through the power converter 100 drops further (e.g., I1), the output voltage of the power converter 100 may drift higher. In response to this higher output voltage, the power converter 100 may be shut down (not shown) and/or enter into the nearly zero-current consumption mode.

Figure 7:
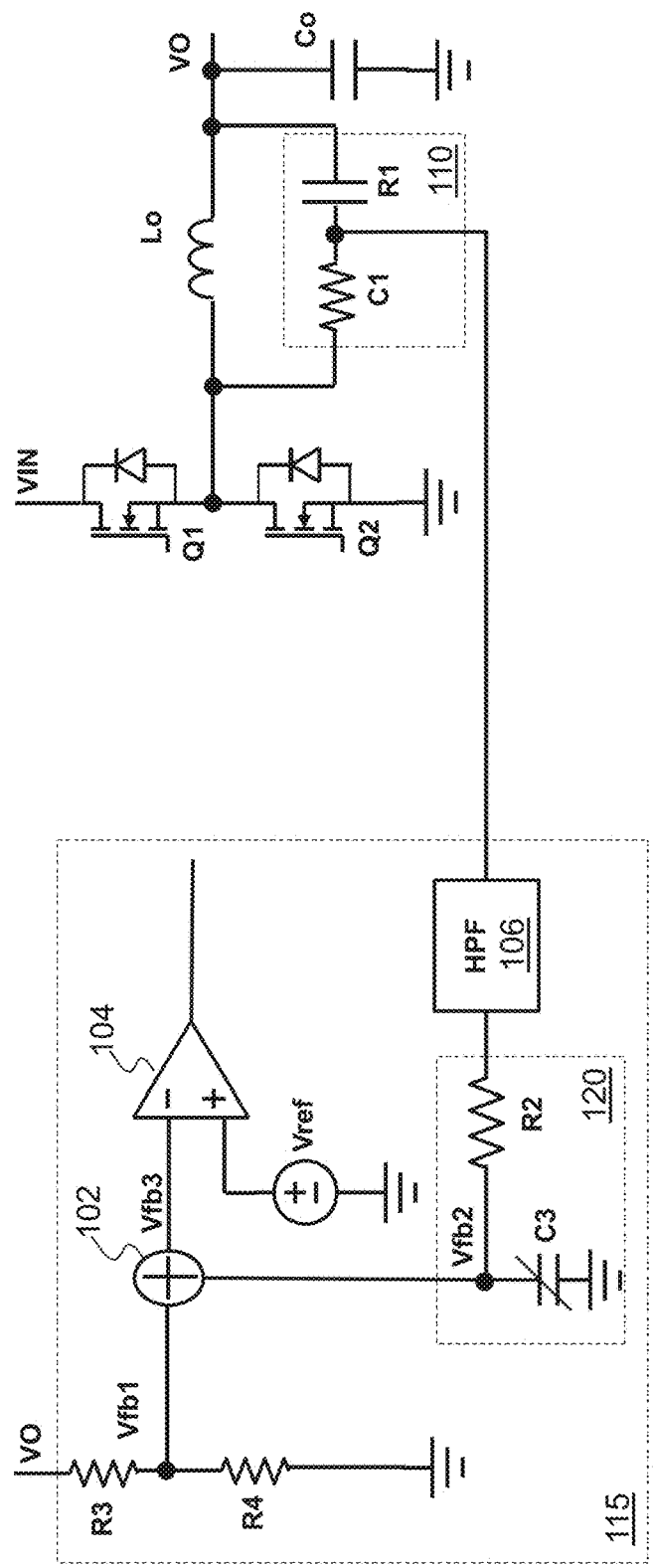
FIG. 7 illustrates a schematic diagram of another implementation of the feedback control apparatus shown in FIG. 2 in accordance with various embodiments of the present disclosure.

FIG. 7 illustrates a schematic diagram of another implementation of the feedback control apparatus shown in FIG. 2 in accordance with various embodiments of the present disclosure. The feedback control apparatus 115 shown in FIG. 7 is similar to the feedback control apparatus 115 shown in FIG. 3 except that the capacitor C3 of the second low-pass filter 120 is an adjustable capacitor.

Referring back to FIG. 6, the power converter 100 may operate at three different portions of the switching frequency chart. In each portion of the switching frequency chart, the power converter 100 may have a different switching frequency. In order to stabilize the power converter 100, the pole of the second low-pass filter 120 may vary in response to the switching frequency change. More particularly, the pole of the second low-pass filter 120 may be placed at the crossover frequency when the power converter 100 operates at the third portion 606 of FIG. 6. The frequency of the pole of the second low-pass filter 120 may be reduced in a linear manner or a pseudo-linear manner when the power converter 100 operates at the second portion 604 of FIG. 6. Furthermore, the pole of the second low-pass filter 120 may be placed at a frequency lower than the minimum switching frequency when the power converter 100 operates at the first portion 602 of FIG. 6.

The adjustable capacitor C3 may be implemented as a plurality of switch-capacitor networks connected in parallel (not shown). The total capacitance of the adjustable capacitor C3 can be adjusted by turning on/off the switches of the plurality of switch-capacitor networks accordingly.

Figure 8:
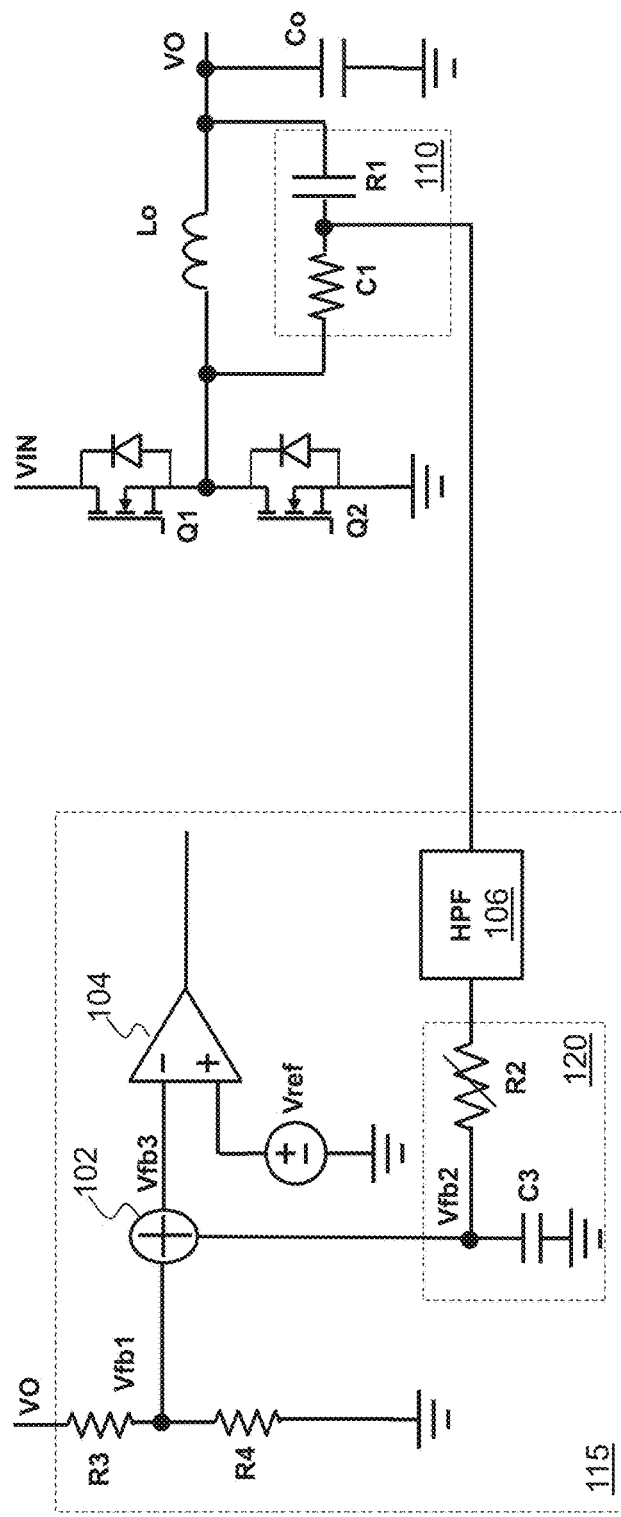
FIG. 8 illustrates a schematic diagram of another implementation of the feedback control apparatus shown in FIG. 2 in accordance with various embodiments of the present disclosure.

FIG. 8 illustrates a schematic diagram of another implementation of the feedback control apparatus shown in FIG. 2 in accordance with various embodiments of the present disclosure. The feedback control apparatus 115 shown in FIG. 8 is similar to the feedback control apparatus 115 shown in FIG. 3 except that the resistor R2 of the second low-pass filter 120 is an adjustable resistor. The resistor R2 may be used to form an adjustable pole of the second low-pass filter 120, which can improve the performance of the power converter 100 as described above with respect to FIG. 7.

The adjustable resistor R2 may be implemented as a plurality of switch-resistor networks connected in parallel (not shown). The total resistance of the adjustable resistor R2 can be adjusted by turning on/off the switches of the plurality of switch-resistor networks accordingly.

Figure 9:
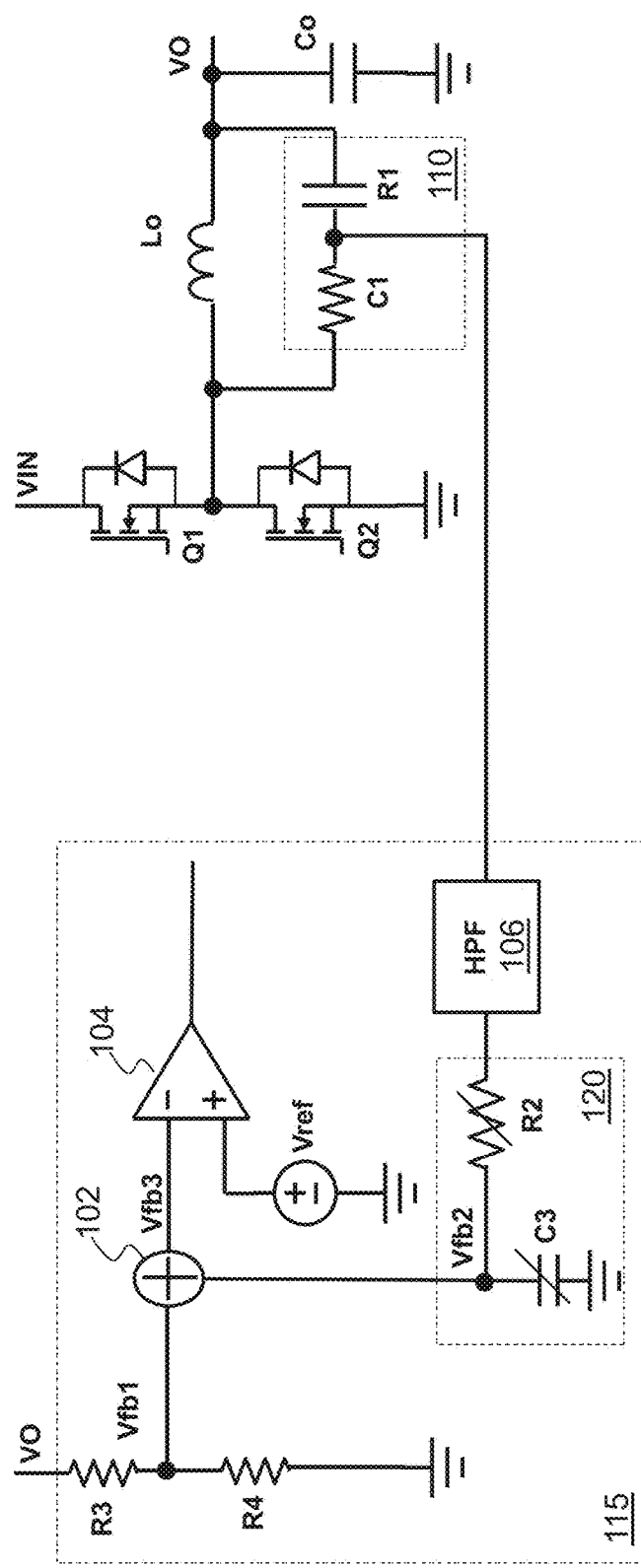
FIG. 9 illustrates a schematic diagram of another implementation of the feedback control apparatus shown in FIG. 2 in accordance with various embodiments of the present disclosure.

FIG. 9 illustrates a schematic diagram of another implementation of the feedback control apparatus shown in FIG.

2 in accordance with various embodiments of the present disclosure. The feedback control apparatus 115 shown in FIG. 9 is similar to the feedback control apparatus 115 shown in FIG. 3 except that the capacitor C3 of the second low-pass filter 120 is an adjustable capacitor and the resistor R2 of the second low-pass filter 120 is an adjustable resistor. The capacitor C3 and the resistor R2, taken individually or in combination, may be used to form an adjustable pole, which can improve the performance of the power converter 100 as described above with respect to FIG. 7.

Figure 10:
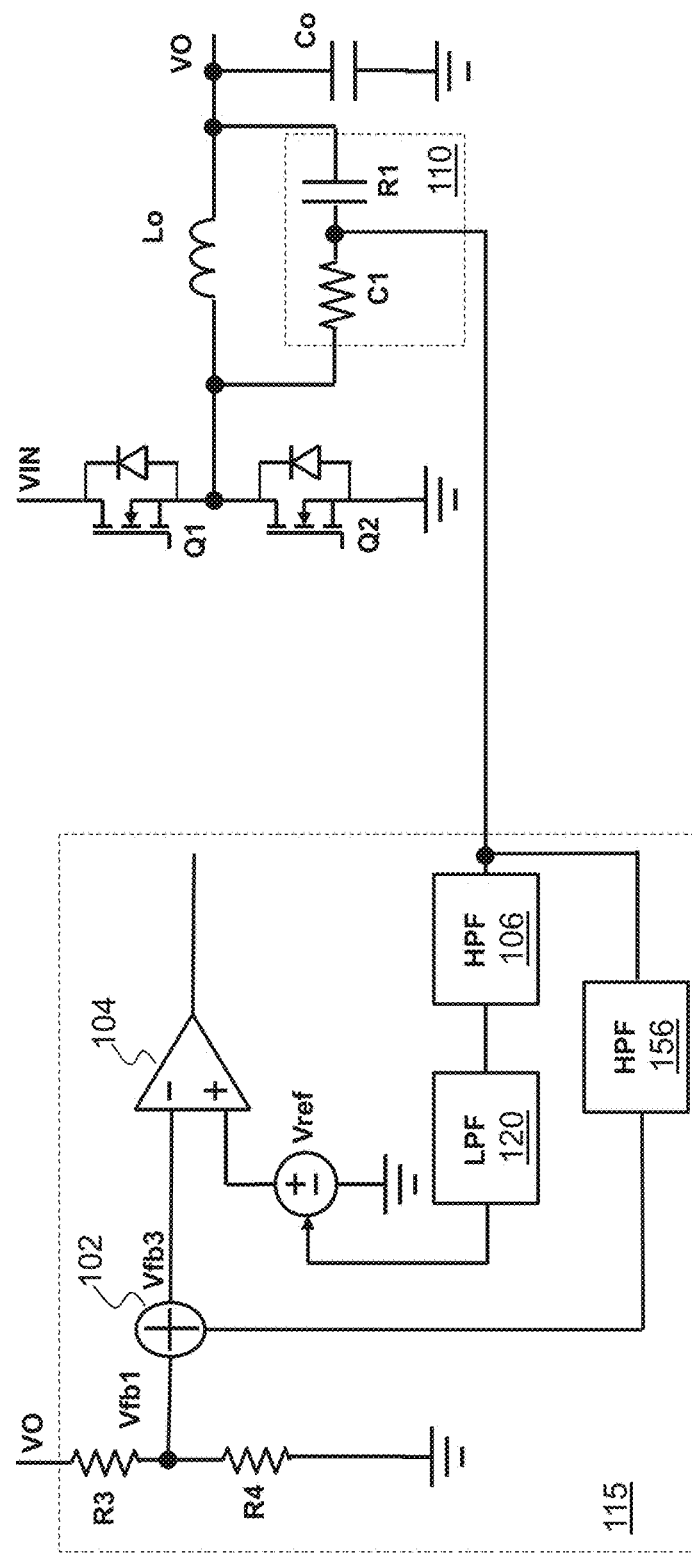
FIG. 10 illustrates a schematic diagram of another implementation of the feedback control apparatus shown in FIG. 2 in accordance with various embodiments of the present disclosure.

FIG. 10 illustrates a schematic diagram of another implementation of the feedback control apparatus shown in FIG. 2 in accordance with various embodiments of the present disclosure. The feedback control apparatus 115 shown in FIG. 10 is similar to the feedback control apparatus 115 shown in FIG. 3 except that the feedback control apparatus 115 comprises two high-pass filters. As shown in FIG. 10, the output of the first low-pass filter 110 is injected into the reference Vref through a first high-pass filter 106 and a second low-pass filter 120. In addition, the output of the first low-pass filter 110 is fed into the adder 102 through a second high-pass filter 156.

One advantageous feature of having the feedback control apparatus 115 shown in FIG. 10 is injecting the output of the first low-pass filter 110 into the adder 102 without passing a low-pass filter helps to provide a higher ripple signal for the comparator to work so as to improve the voltage regulation of the power converter 100.

Figure 11:
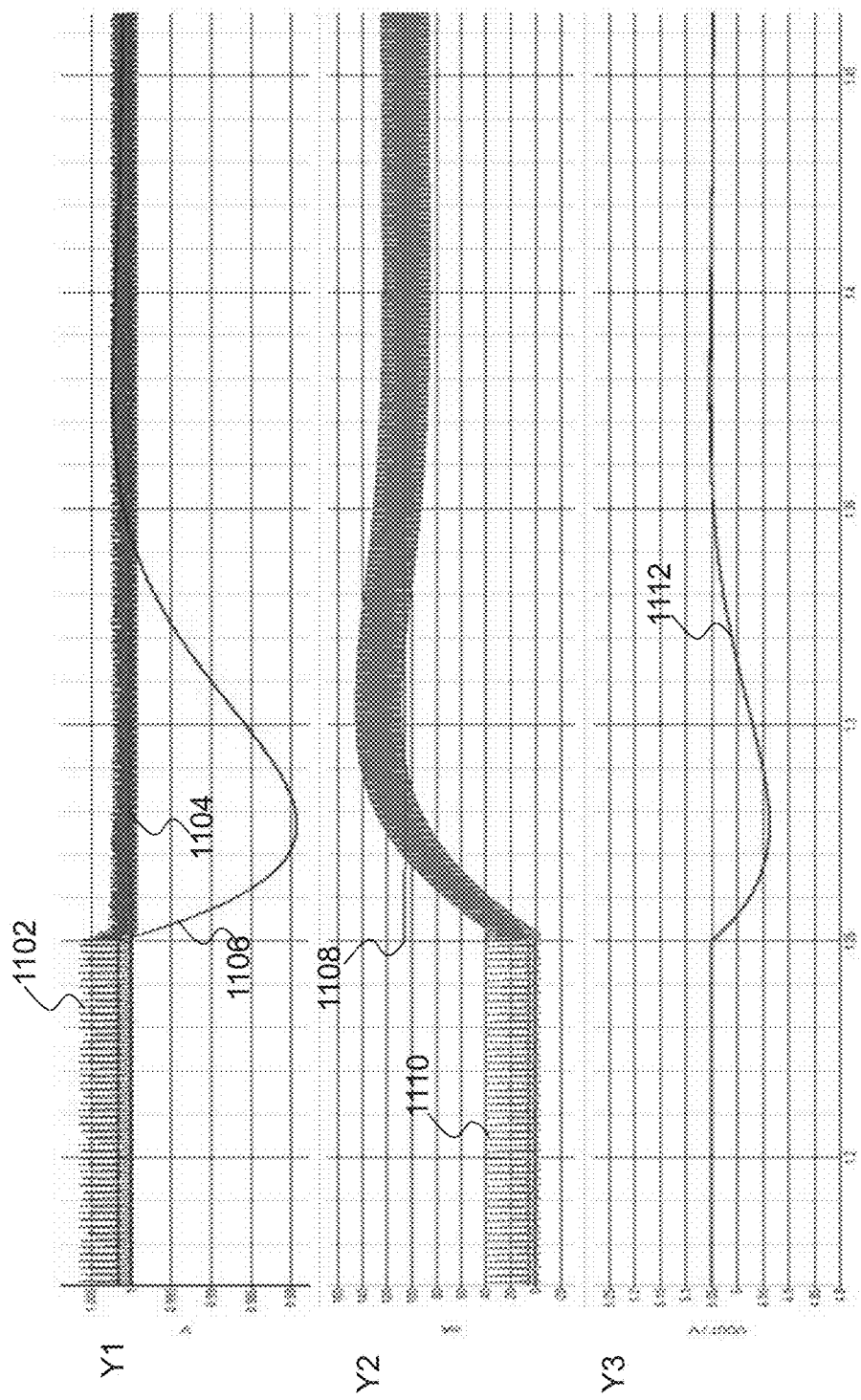
FIG. 11 illustrates waveforms of the power converter shown in FIG. 2 in accordance with various embodiments of the present disclosure.

FIG. 11 illustrates waveforms of the power converter shown in FIG. 2 in accordance with various embodiments of the present disclosure. The horizontal axis of FIG. 11 represents intervals of time. The unit of the horizontal axis is second. There may be three vertical axes. The first vertical axis Y1 represents the first feedback signal (raw feedback signal), the second feedback signal (final feedback signal) and the reference voltage. The second vertical axis Y2 represents the load current of the power converter 100 and the current flowing through the inductor Lo. The third vertical axis Y3 represents the output voltage of the power converter 100.

As shown in FIG. 11, before a load transient from about 0 A to about 120 mA, the power converter 100 operates at a reduced switching frequency mode due to a light output load condition. After the load transient indicated by waveform 1108, the output voltage waveform 1112 shows the output voltage Vo drops about 10 mV. In response to the voltage drop of Vo, the first feedback signal 1106 has a drop proportional to the voltage drop of Vo. Both the inductor current waveform 1110 and the second feedback signal 1102 show the power converter 100 enters into the normal operation mode after the load transient. As shown in FIG. 11, the regular pulses of the switching waveform of 1110 before the load transient indicate, under light loads, the power converter 100 operates in a reduced switching frequency mode (e.g., the minimum switching frequency mode having a switching frequency of 100 kHz).

Figure 12:
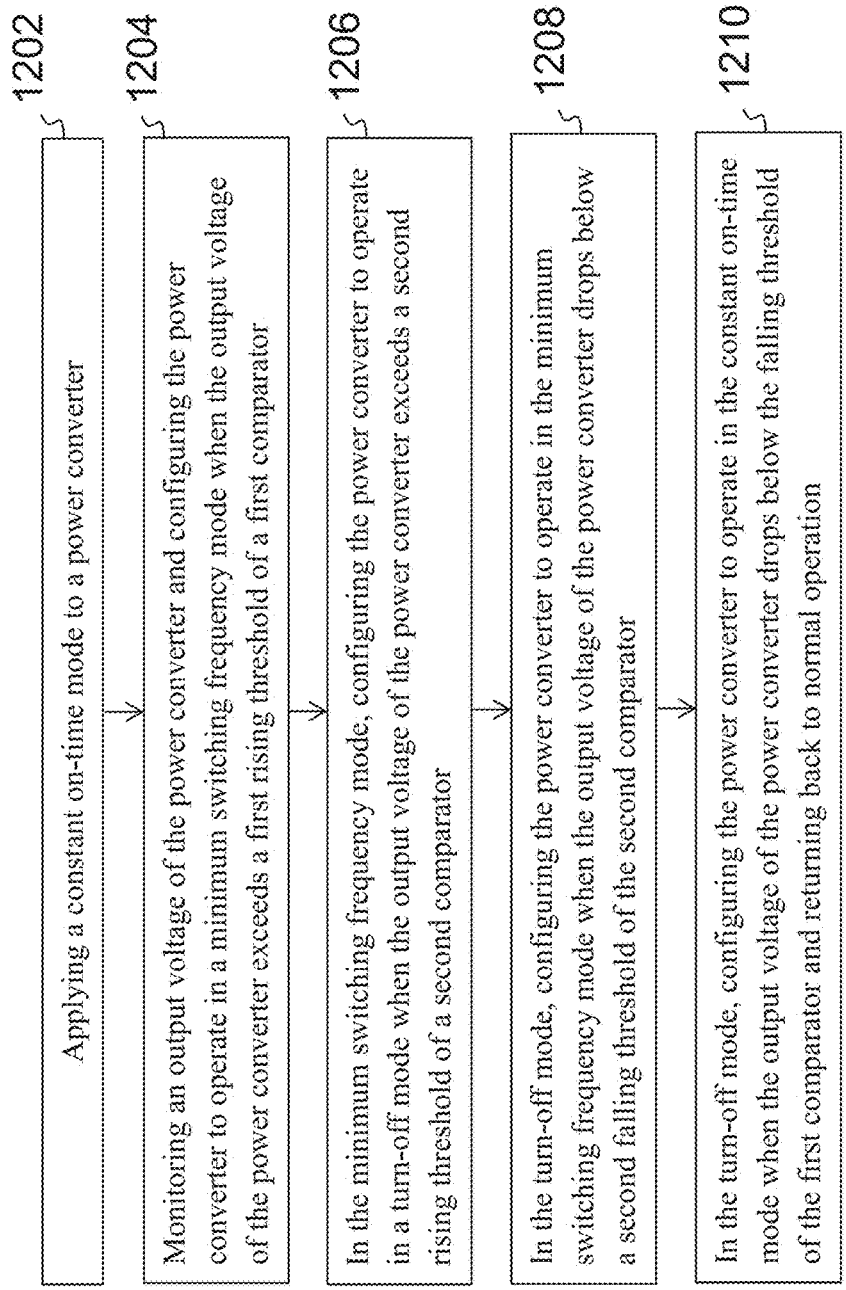
FIG. 12 illustrates a flow chart of a method for controlling the power converter shown in FIG. 1 in accordance with various embodiments of the present disclosure.

FIG. 12 illustrates a flow chart of a method for controlling the power converter shown in FIG. 1 in accordance with various embodiments of the present disclosure. This flow-chart shown in FIG. 12 is merely an example, which should not unduly limit the scope of the claims. One of ordinary skill in the art would recognize many variations, alternatives, and modifications. For example, various steps illustrated in FIG. 12 may be added, removed, replaced, rearranged and repeated.

Referring back to FIG. 2, the power converter 100 comprises the first switch Q1, the second switch Q2 connected in series between an input power source VIN and ground. The inductor is connected between a common node of Q1 and Q2, and the output of the power converter 100. In operation, the power converter operates in a constant on-time mode when the load of the power converter 100 is heavy. In the constant on-time mode, a switching ripple voltage is applied to the comparator 104 through a first low-pass filter 110, a high-pass filter 106 and a second low-pass filter 120. When the load of the power converter 100 is light, depending on the detected output voltage, the power converter 100 may operate in the minimum switching frequency mode or the turn-off mode.

At step 1202, depending on load conditions, the control circuit may apply the constant on-time mode to the power converter 100. In the constant on-time mode, the feedback signal of the control circuit is a sum of a first feedback signal and a second feedback signal. The first feedback signal is generated by dividing the output voltage of the power converter 100 through a divider. The second feedback signal is generated from a switching ripple voltage. A ripple emulator can be used to generate the switching ripple signal with the first low-pass filter.

At step 1204, when the output voltage of the power converter 100 exceeds a first rising threshold of a first comparator, the power converter is configured to operate in a minimum switching frequency mode. In some embodiments, the minimum switching frequency is about 100 kHz. The first rising threshold is about 102% of the regulated output voltage of the power converter 100.

At step 1206, in the minimum switching frequency mode, when the output voltage of the power converter exceeds a second rising threshold of a second comparator, the power converter 100 is configured to operate in the turn-off mode.

At step 1208, in the turn-off mode, when the output voltage of the power converter 100 drops below a second falling threshold of the second comparator, the power converter 100 is configured to operate in the minimum switching frequency mode. In some embodiments, the second falling threshold is about 103% of the regulated output voltage of the power converter 100.

At step 1210, in the minimum switching frequency mode, when the output voltage of the power converter drops below a first falling threshold of the first comparator, the power converter is configured to operate in the constant on-time mode once again (returning back to normal operation). In some embodiments, the second rising threshold is about 104% of the regulated output voltage of the power converter 100. The first falling threshold is about 101% of the regulated output voltage of the power converter 100.

It should be noted that a switching frequency whenever the power converter operates is limited to a minimum frequency which allows pole and zero settings for low-pass and high-pass filters of the power converter. Furthermore, the pole and zero settings of the power converter are adjustable with the knowledge of frequency limitations in each mode of operation that the power converter has. In particular, the poles, zeros and/or the pole-zero settings that determine the filter settings can be a variable or adjustable and can be configured automatically depending on the frequency of operation and mode of operation of the power converter itself. The mode of operation of the power converter is deduced from an output state of the comparators used to set the mode of operation for the power converter.

It should further be noted that the control circuit monitors an output voltage of the power converter and configures the power converter to operate in the minimum switching frequency mode when the output voltage of the power converter exceeds a rising threshold of a first comparator. This can be achieved without the use of an integrator that is normally required to regulate output voltage accurately without any offsets.

It should be noted that the first low-pass filter, the high-pass filter and the second low-pass filter are configured to prevent the power converter from operating in a burst mode. During the burst mode, irregular pulses such as two on pulses and then an off period and followed by two on pulses again may occur under low or moderate load conditions. In comparison, the power converter of this disclosure operates in a constant frequency mode while the frequency scales down as load current is reduced.

It should be noted that the output of the first low-pass filter is sequentially filtered by the high-pass filter and the second low-pass filter to generate a feedback signal for the control loop. Furthermore, the second low-pass filter is configured to be an all-pass filter. An input signal of the second low-pass filter is approximately equal to an output signal of the second low-pass filter.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
    a first switch and a second switch connected in series between an input power source and ground;
    an inductor connected between a common node of the first switch and the second switch, and an output capacitor; and
    a comparator having a first input connected to a reference, a second input configured to receive a sum of a first feedback signal and a second feedback signal and an output configured to generate a turn-on signal of the first switch, wherein:
        the first feedback signal is proportional to a voltage across the output capacitor; and
        the second feedback signal is generated by applying a first low-pass filter to a switching ripple voltage, wherein the first low-pass filter has a first terminal and a second terminal directly connected to a first terminal and a second terminal of the inductor respectively.

2. The apparatus of claim 1, further comprising:
    applying the first low-pass filter, a first high-pass filter and a second low-pass filter to the switching ripple voltage, wherein the switching ripple voltage is a voltage across a capacitor of the first low-pass filter, and wherein an output of the first low-pass filter is sequentially filtered by the first high-pass filter and the second low-pass filter to generate the second feedback signal.

3. The apparatus of claim 2, wherein:
    the second low-pass filter is configured to be an all-pass filter, and wherein an input signal of the second low-pass filter is approximately equal to an output signal of the second low-pass filter.

4. The apparatus of claim 1, further comprising:
    a first operation mode comparator and a second operation mode comparator configured to monitor a voltage across the output capacitor.

5. The apparatus of claim 4, wherein:
    the first operation mode comparator is configured to generate a first signal allowing the apparatus to leave a constant on-time mode and enter into a minimum switching frequency mode after the voltage across the output capacitor exceeds a rising threshold of the first operation mode comparator; and
    the second operation mode comparator is configured to generate a second signal allowing the apparatus to leave the minimum switching frequency mode and enters into a turn-off mode after the voltage across the output capacitor exceeds a rising threshold of the second operation mode comparator, and wherein a switching frequency whenever the apparatus operates is limited to a minimum frequency which allows pole and zero settings for low-pass and high-pass filters, and wherein the pole and zero settings is adjustable with knowledge of frequency limitations in each mode of operation that the apparatus has, and wherein the mode of operation of the apparatus is deduced from an output state of the comparators used to set the mode of operation for the apparatus.

6. The apparatus of claim 5, wherein:
    the rising threshold of the second operation mode comparator is greater than the rising threshold of the first operation mode comparator.

7. The apparatus of claim 5, wherein:
    the first operation mode comparator is configured to generate a third signal allowing the apparatus to leave the minimum switching frequency mode and enter into the constant on-time mode after the voltage across the output capacitor drops below a falling threshold of the first operation mode comparator; and
    the second operation mode comparator is configured to generate a fourth signal allowing the apparatus to leave the turn-off mode and enter into the minimum switching frequency mode after the voltage across the output capacitor drops below a falling threshold of the second operation mode comparator.

8. The apparatus of claim 7, wherein:
    the falling threshold of the second operation mode comparator is greater than the falling threshold of the first operation mode comparator.

9. The apparatus of claim 1, further comprising:
    a control circuit configured to detect an output voltage of the input power source and the output voltage of the apparatus, wherein the control circuit is configured such that a turn-on time of the first switch is proportional to a ratio of the output voltage of the apparatus to the output voltage of the input power source.

10. The apparatus of claim 1, further comprising:
    applying the first low-pass filter and a second low-pass filter to the switching ripple voltage, wherein:
        the first low-pass filter comprising a first resistor and a first capacitor connected in series; and the second low-pass filter comprising a second resistor and a second capacitor connected in series, and wherein an input of the second low-pass filter is coupled to a common node of the first capacitor and the first resistor through a first high-pass filter, and an output of the second low-pass filter is coupled to the comparator.

11. A method comprising:
applying a hysteretic control mode to a power converter;
monitoring an output voltage of the power converter and configuring the power converter to operate in a minimum switching frequency mode when the output voltage of the power converter exceeds a rising threshold of a first comparator;
in the minimum switching frequency mode, configuring the power converter to operate in a turn-off mode when the output voltage of the power converter exceeds a rising threshold of a second comparator and configuring the power converter to operate in the hysteretic control mode when the output voltage of the power converter drops below a falling threshold of the first comparator; and
in the turn-off mode, configuring the power converter to operate in the minimum switching frequency mode when the output voltage of the power converter drops below a falling threshold of the second comparator.

12. The method of claim 11, wherein:
the hysteretic control mode is a constant on-time mode in which the output voltage of the power converter is regulated to a predetermined value.

13. The method of claim 12, wherein the power converter comprises:
a first switch and a second switch connected in series between an input power source and ground;
an inductor connected between a common node of the first switch and the second switch, and an output capacitor; and
a comparator having a first input connected to a reference, a second input configured to receive a sum of a first feedback signal and a second feedback signal and an output configured to generate a turn-on signal of the first switch, wherein:
the first feedback signal is proportional to a voltage across the output capacitor; and
the second feedback signal is generated by applying a first low-pass filter, a high-pass filter and a second low-pass filter to a switching ripple voltage.

14. The method of claim 13, wherein:
the first low-pass filter, the high-pass filter and the second low-pass filter are configured to prevent the power converter from operating in a burst mode.

15. The method of claim 13, further comprising:
configuring the power converter such that a turn-on time of the first switch is proportional to a ratio of the output voltage of the power converter to an output voltage of the input power source.

16. The method of claim 13, further comprising:
dynamically adjusting a pole of the second low-pass filter so as to improve voltage regulation.

17. The method of claim 13, further comprising:
configuring the power converter to leave the constant on-time mode and enter into the minimum switching frequency mode by reducing a switching frequency of the power converter in a pseud-linear manner.

18. A power converter comprising:
a first switch and a second switch connected in series between an input power source and ground;
an inductor connected between a common node of the first switch and the second switch, and an output capacitor;
a feedback control apparatus comprising a first low-pass filter connected in parallel with the inductor, a high-pass filter and a comparator having a first input connected to a reference and a second input configured to receive a sum of a signal detected from the output capacitor and an output signal generated by the first low-pass filter and the high-pass filter, wherein poles and zeros that determine settings of the filters are adjustable and the poles and zeros are reconfigured automatically depending on a switching frequency and a mode of operation of the power converter;
an on-time control apparatus; and
a latch having a set input configured to receive an output signal of the feedback control apparatus and a reset input configured to receive an output signal of the on-time control apparatus.

19. The power converter of claim 18, further comprising:
a first operation mode comparator configured to monitor a voltage across the output capacitor and generate a first signal allowing the power converter to enter a minimum switching frequency mode after the voltage across the output capacitor exceeds a rising threshold of the first operation mode comparator; and
a second operation mode comparator configured to monitor the voltage across the output capacitor and generate a second signal allowing the power converter to enter a turn-off mode after the voltage across the output capacitor exceeds a rising threshold of the second operation mode comparator.

20. The power converter of claim 18, further comprising:
a minimum frequency control unit comprising a timer configured to set up a minimum switching frequency of the power converter, wherein an output of the minimum frequency control unit and an output of the feedback control apparatus are fed into the set input of the latch through an OR gate.

21. The power converter of claim 18, wherein:
the on-time control apparatus is configured such that a turn-on time of the first switch is proportional to a ratio of an output voltage of the power converter to an output voltage of the input power source.

22. The power converter of claim 18, wherein:
the power converter operates in low power modes without having an integrator, and wherein the first low-pass filter and the high-pass filter are configured to create a feedback signal for the power converter without having the integrator, and wherein power consumption has been reduced in the low power modes through eliminating the integrator.

* * * * *